Aug. 13, 1940. W. E. GILMORE 2,210,975
REFRIGERATOR TRUCK AND METHOD OF OPERATING THE SAME
Filed July 23, 1934 9 Sheets-Sheet 1

Aug. 13, 1940.  W. E. GILMORE  2,210,975
REFRIGERATOR TRUCK AND METHOD OF OPERATING THE SAME
Filed July 23, 1934   9 Sheets-Sheet 2

Inventor
William E. Gilmore

Aug. 13, 1940.  W. E. GILMORE  2,210,975
REFRIGERATOR TRUCK AND METHOD OF OPERATING THE SAME
Filed July 23, 1934  9 Sheets-Sheet 6

Aug. 13, 1940.   W. E. GILMORE   2,210,975
REFRIGERATOR TRUCK AND METHOD OF OPERATING THE SAME
Filed July 23, 1934   9 Sheets-Sheet 7

Patented Aug. 13, 1940

2,210,975

UNITED STATES PATENT OFFICE 2,210,975

REFRIGERATOR TRUCK AND METHOD OF OPERATING THE SAME

William E. Gilmore, Lyndhurst, N. J.

Application July 23, 1934, Serial No. 736,440

22 Claims. (Cl. 62—91.5)

This invention relates to a refrigerator truck and its operation, and the object of the invention is to produce a refrigerator truck which can be built economically and of a light construction while utilizing refrigerant efficiently, and to operate it in an efficient manner.

A further object is to construct a refrigerator truck so that it can be readily and quickly loaded and unloaded, in large amounts or small, as preferred.

Another object is to so construct the insulating walls of the refrigerator body that they may be efficient for insulation with the minimum of weight.

Another object of the invention is to provide means for accurately gauging the use of refrigerant that is employed.

Many minor objects and improvements will appear as the description proceeds.

In the accompanying drawings forming a part of this specification Fig. 25ª illustrates the operation of the discharge handle.

Figures 1, 2, 3, 4, 5:
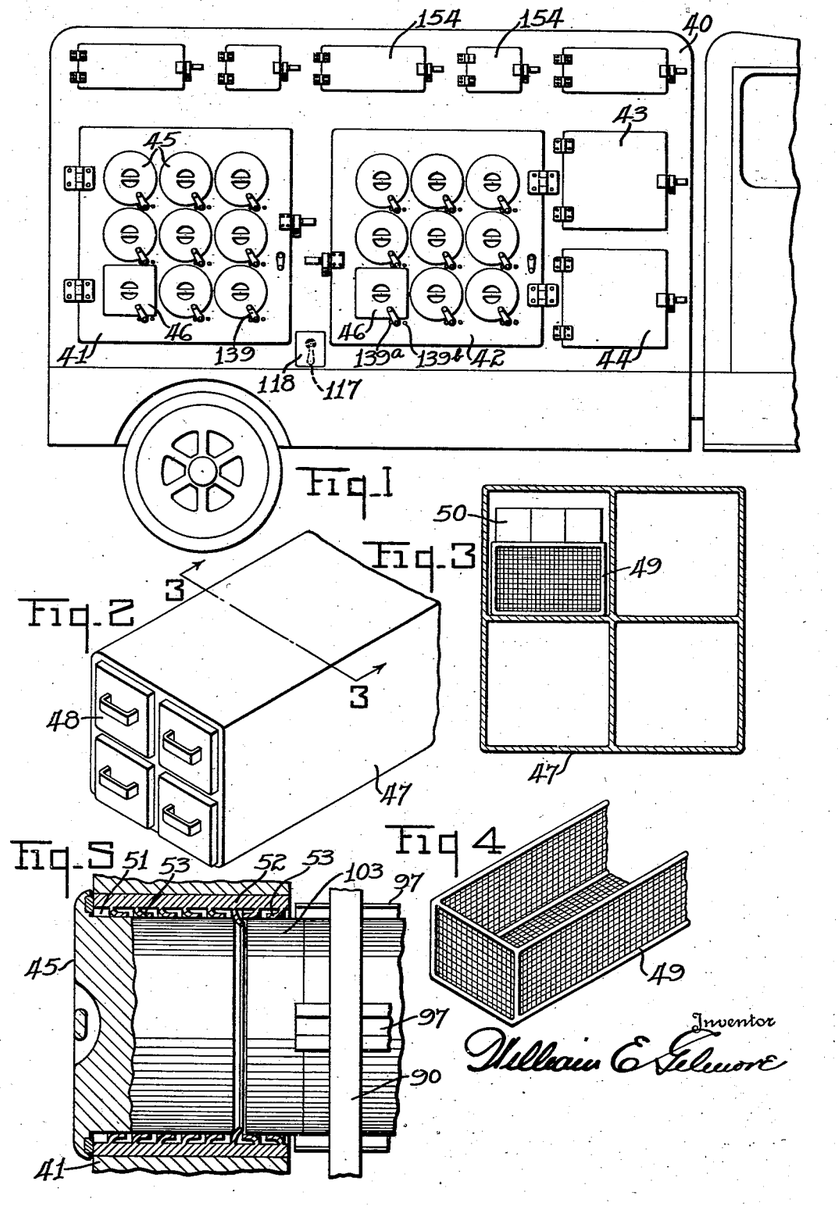
Figure 1 is a side elevation of one form of refrigerating body embodying many features of this invention.
Fig. 2 is a detail view of the discharge end of one form of container used in the truck.
Fig. 3 is an enlarged section approximately on the line 3—3 of Fig. 2.
Fig. 4 is a partial view of a basket shown in Fig. 3.
Fig. 5 is a detail of a sealing joint for a door.

In Figure 1 there is shown a truck having a body 40 provided in the side with two large doors 41 and 42 and two relatively small doors 43 and 44. The smaller doors may be used for inserting any desired articles which can be readily handled by hand. In the construction shown the larger doors are employed for allowing the loading of material on a loading rack and the discharge thereof by mechanical means through outlet doors 45 in the large doors 44.

The design shown is intended primarily for ice cream, and will be discussed as constructed for that purpose, although it will be readily understood that the general principles can be used with modification in details for use with other materials. In the majority of cases the ice cream is packed in round cans and accordingly most of discharge doors 45 are shown circular in cross section. However, there is usually desired some package goods, and square doors 46 are indicated for the discharge of packaged goods. In Fig. 2 there is shown a can 47 for carrying packaged goods. This is provided with four compartments, each with its separate door 48, and in each compartment there is one or more wire baskets 49 or the like in which bricks 50 or other packages of ice cream may be loaded.

In the side of the large door 41 or 42 there are provided gaskets surrounding each opening 51 within which an outlet door 45 is placed. Preferably these gaskets 52 are provided with flexible flanges 53 of rubber or the like.

Figure 6:
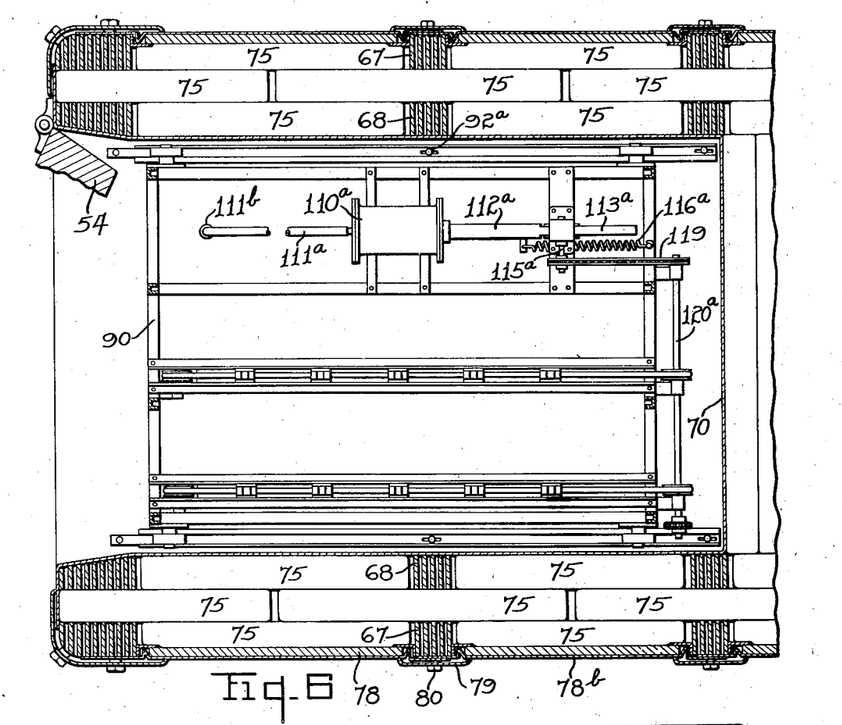
Fig. 6 is a partial longitudinal horizontal section of a somewhat different arrangement of a truck body.

The side discharging truck, shown in Fig. 1, may be sometimes desirable, but there may be as readily employed an end discharging truck, such as shown in section in Fig. 6. In this case the arrangement is much like it is in the construction shown in Fig. 1, except that the door 54, corresponding to main doors 41 and 42, is in the rear end of the truck body instead of being in the side.

One of the advantages of my construction is in the way in which the insulating walls of the body are formed and mounted upon the truck frame. This is shown somewhat diagrammatically in Fig. 9. In this view there are shown the two truck frame members 55 and 56. Upon frame member 55 there is mounted a vertical pin 57 carrying a head 58 which has a slideway therein for a slide 59 attached to the bottom 60 of the truck body. The head 58 is likewise pivoted to pin 57. Frame member 56 carries a pin 61 on which there is pivoted a head 62 attached directly to the bottom 60 of the truck body. It will be readily seen by this construction that the relative tipping and twisting of the frame members with respect to each other and the body is taken care of by this jointed construction, while the general relation of the parts is securely maintained.

While the insulated walls may be constructed in various ways, the preferred construction is that illustrated in the drawings and in which there are shown bottom strip members 63 and 64, top strip members 65 and 66, and side strip members 67, 68. These are bolted together by bolts 69 or similar fastenings and form a fairly strong frame for the truck body. This is preferably lined with sheet metal 70 or the like and is duly covered on the outside.

Figure 12:
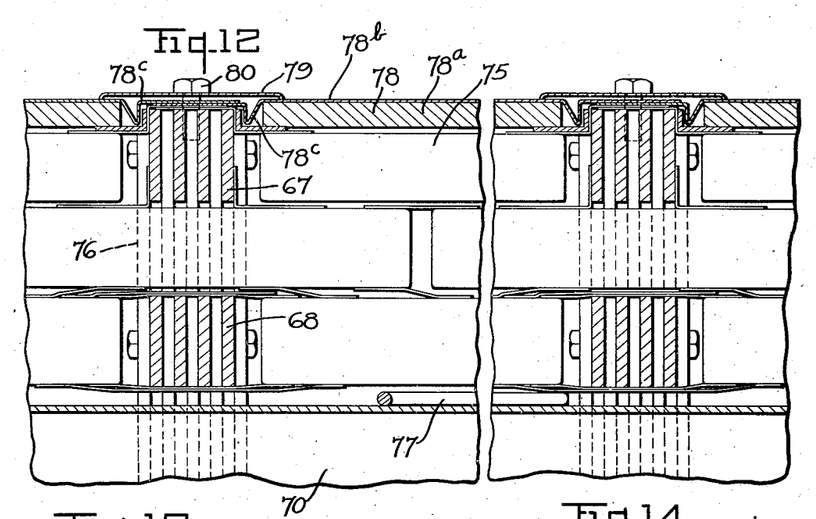
Fig. 12 is a cross sectional view through a portion of one side wall of the truck.
Figures 13, 14:
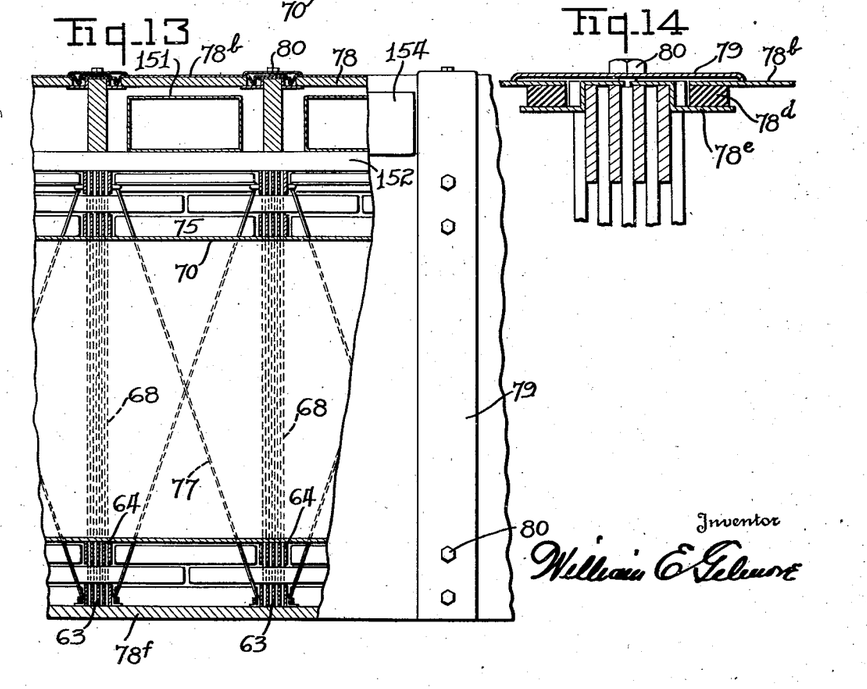
Fig. 13 is an inside view of a side wall approximately on the line 13—13 of Fig. 9.
Fig. 14 is a detail view of an alternative method of securing outside panels to the frame.

There are a plurality of these frames around the truck at intervals, as clearly shown in detail Figs. 12 and 13. The strips may be of ply-wood, and all top and bottom strips and all side strips are alike, and have like placed holes therein, which facilitates construction.

These frames maintain their square shape with considerable rigidity, but may be bent to a small extent laterally of their plane, immediately springing back to original position when permitted. They also form a support for insulating blocks which may be separately formed and slipped into place in the body. In the construction indicated, these are shown as being blocks 75 which just fit within successive frame members. Similar blocks slip between the parallel frame members of each side, as shown at 76, and in this way there are three layers of the blocks in each wall, the blocks preferably being arranged to split joints, as indicated in Fig. 12.

The several body frame members are connected by stayrods 77, as indicated in Fig. 13.

Outside panels 78 are held in place against the frames by plates 79 secured to the frame by bolts 80 or the like. In the preferred construction, shown in Fig. 12, each panel 78 comprises a backing 78$^a$, of wood or of other suitable insulating and stiffening material, covered by a flexible metal sheet 78$^b$, the ends of which are bent, as indicated at 78$^c$, to form yielding cushion means at the joints between frame members and panels.

In the construction indicated in Fig. 14, there is a similar arrangement, except that strips of rubber 78$^d$ are interposed between, and preferably vulcanized to the panel sheets 78$^b$ and their flanges 78$^e$, in place of bent portions 78$^c$, shown in Fig. 12.

The top and the sides, except where there are doors, may be covered by a series of thin panels which are largely interchangeable. Preferably a wood floor 78$^f$ is provided under the body.

Figures 7, 8:
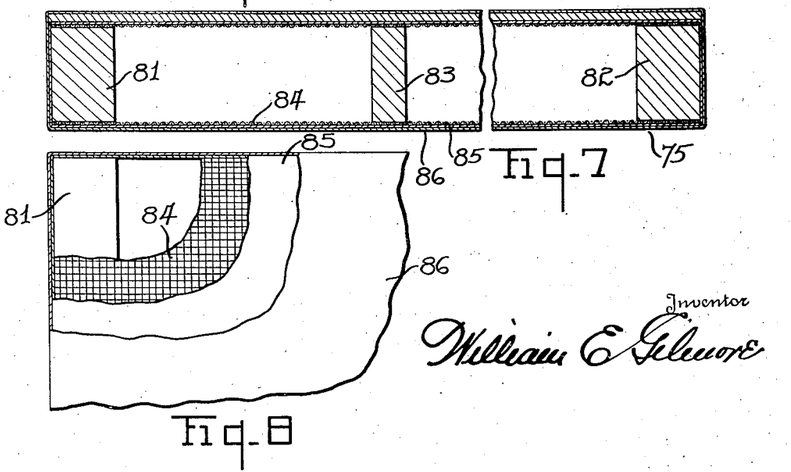
Fig. 7 is a detail showing an insulating block employed in the wall of the truck body.
Fig. 8 is an enlarged detail of a corner of the block shown in Fig. 7, parts being broken away.

While the insulating pads may be made in various ways, in the form shown they are constructed of frame members 81, 82 around the edge of the block and as many cross braces 83 cross the space between the outer frame as is found necessary. The frame and filler strips 83 are then covered with suitable side coverings so as to form a substantially airtight cover. Preferably the interior of the blocks are finally sealed in such a way as to produce a partial vacuum therein. One convenient way in which this may be accomplished is to provide the interior with hot gases just before the sealing is accomplished, whereby subsequent cooling will create the desired partial vacuum. Other means may be employed for this purpose if desired.

The covering may be made of any suitable material but, as illustrated in Fig. 8, there is a 3-ply covering made of layers 84, 85 and 86, respectively. I have found the following materials suitable for these plies: For the inner ply there is a wire mesh 84, next a layer 85 of kopec or similar insulating composition, and outside a layer 86 of tough water-proof paper. The frame and brace members may advantageously be of celotex or the like.

With a body constructed in this manner the whole body and the various portions thereof may give and sway somewhat to the relative movements of portions of the truck frame while being amply strong to stand any ordinary usage to which it will be subjected.

By my method of mounting the material, which is carried in the truck, I greatly reduce the stresses to which the sides and top of the truck body are subjected. The greater portion of the weight of the material carried by the truck is supported directly upon the bottom of the truck body through means of a rack. As indicated Fig. 17, this rack 90 is provided with wheels 91 adapted to run in grooved tracks 92 on the bottom of the truck body. Grooved tracks 92 are provided with flanges 93 under which there project hook members 94 attached to the rack 90, in this way holding the wheels firmly in the channels at the bottom of the truck body. Where tracks 92 run across the body, they are placed over bottom frame members. In the construction shown in Fig. 6, they are bolted to the frame members, rigidly at the rear and by bolt and slot connections 92$^a$ at the other frames, so as to allow for some weaving of the body.

Likewise there is provided on each rack a pawl 95 adapted to engage an adjustable toothed member 96 attached to the track 92 so as to hold the rack in the truck to the position into which it has been moved, until catch 95 is deliberately raised by its handle 96 to release the rack and allow it to be run out from the truck.

In this way it will be readily seen that rack 90 may be run into and out of the truck body, as desired, through door 41, 42 or 54, as the case may be, and is securely carried by the bottom of the truck body without imposing any material strain upon the sides or top of the body.

Figure 17:
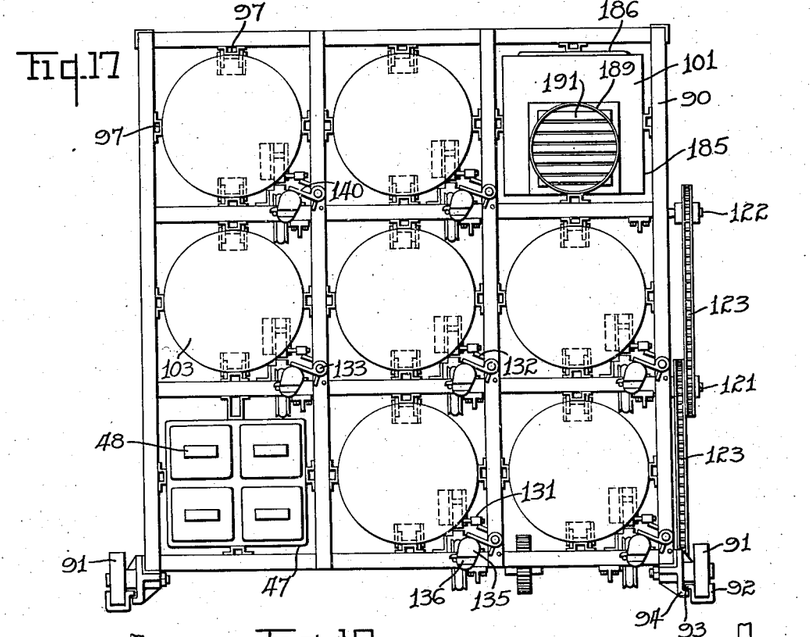
Fig. 17 is a front elevation of the rack shown in place in the truck in Fig. 13.
Figures 18, 19, 20:
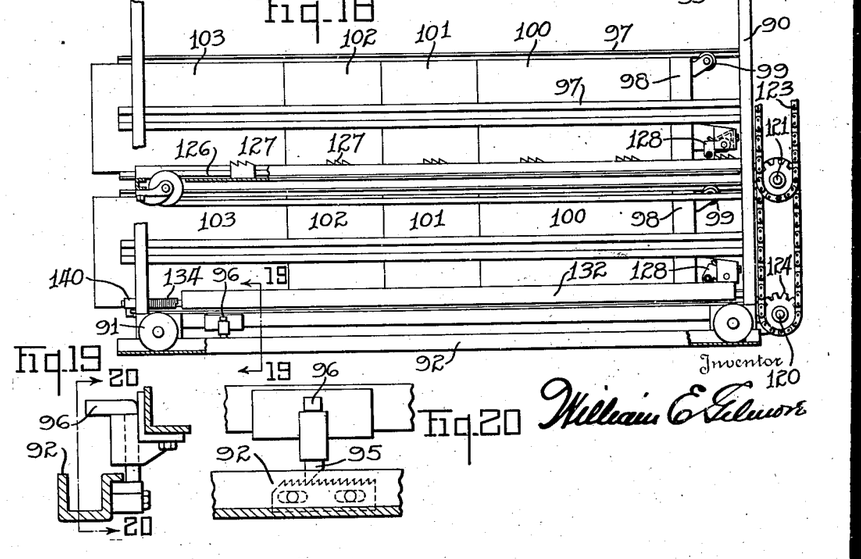
Fig. 18 is a partial vertical section of the rack in place in the truck.
Fig. 19 is a detail view on the line 19—19 of Fig. 18.
Fig. 20 is a detail view on the line 20—20 of Fig. 19.

In the construction indicated in Figs. 17 and 18 the rack 90 is provided with a plurality of compartments, in this case 9 in number. Each compartment is provided with top, bottom and side rails or guides 97. Running along these guides there is a follower 98 which may be provided with anti-friction wheels 99, if desired. Sliding within the tracks 97 and against the bottom 98 there are suitable ice cream cans 100, 101, 102 and 103, as indicated in Fig. 18. It will be understood that there may be more or less in number, but in the construction indicated there are two large cans and two half size cans shown.

As viewed in Fig. 17, there is also shown in the upper right hand corner of rack 90, in the compartment in that corner, a cooling unit 101, which may be of any desired construction, as will be discussed later.

In the lower left hand corner, as viewed in Fig. 17, there is a container, such as shown in Fig. 2, for package material.

As will be readily seen from the above, the rack carrying the ice cream and, if desired, a refrigerant can also be loaded in the factory and run bodily into the truck, and the door closed thereon. During this closing of the door the outer can 103 engages the inner flanges 53 on gasket 52, as shown in Fig. 5, for reasons which will be discussed later.

The arrangement is such that one or more of the cans of ice cream can be discharged, preferably by power means, without allowing cool air to escape or warm outside air to enter the truck body during such discharge. An arrangement for this purpose will be described at this time. Mounted at the bottom of the body there is a vacuum cylinder 110 which may be evacuated from the motor in a well known manner through pipe 111. Piston rod 112 has teeth formed thereon at 113 which engage with a spur gear 114 (see Fig. 15) on a shaft 115, which runs along the side of the body in the form shown in Figs. 1 and 15.

Normally the rod 112 is held in its outward position by a spring 116. When the device is to be operated, the handle 117 is moved so as to open a valve in box 118 (see Fig. 1) and connect pipe 111 to the intake manifold of the motor, and the rod 112 is drawn towards the cylinder and the shaft 115 is rotated thereby.

In the form shown in Fig. 6, the vacuum cylinder is mounted in one of the compartments of the rack, and shaft 115ª, corresponding to shaft 115, is a countershaft also mounted with the vacuum cylinder and connected by a sprocket chain 119 with a shaft 120ª, similar to shaft 120 of the form shown in Fig. 15, as will be described more fully. The operation is substantially the same in both cases, except that in the form shown in Fig. 15, pipe 111 permanently connects the cylinder with a valve in box 118 suitably mounted outside of the refrigerator chamber, but preferably protected by the walls of the truck body from outside weather conditions. In the form shown in Fig. 6, pipe 111ª is preferably flexible, and may be connected detachably by a union 111ᵇ to a pipe leading to the vacuum valve.

If preferred, the vacuum valve may be located in the cab, or any suitably protected point, and may be operated from a distance, in the manner customary with the choke valve of the motor or otherwise. If the valve were placed within the refrigerated space, difficulty might be encountered in its operation.

The rack 90 carries at its inner end three shafts 120, 121 and 122 which are connected by suitable sprocket chains 123 so as to be driven in unison. These three shafts are located approximately at the bottom of each tier of compartments of the rack. The lower shaft 120 is provided with a spur gear 124 which meshes with a spur gear 125 on the shaft 115 carried by the truck body and operated in the manner set forth. It will be seen, therefore, that when the rack is in place so that gears 124 and 125 are in mesh, operation of rod 112 turns shafts 120, 121 and 122 in unison. Driven by each of shafts 120, 121 and 122 there is a member 126. Each of these and their operative connections is the same and, therefore, but one will be described, attention in this connection being called to Figs. 18 and 21 to 25ª inclusive.

It will be seen that member 126 is reciprocated each time rod 112 is reciprocated and to substantially the same extent. Member 112 carries a series of toothed members 127, each adapted to engage pawl 128, pivoted at 129 on a bracket extending from follower 98, which is normally pressed towards engaging position by a spring 130. It will be seen that by the reciprocation of member 126 toothed members 127 will engage pawl 128 and drive follower 98 therewith towards the front or discharge end of the compartment while, upon return movement of the member 126, the toothed member slides under the pawl. In order to select the compartment from which a can is to be discharged, the pawl 128 is normally held upward out of engagement with the toothed member 127. This is done by means of a pin 131 extending from the pawl and engaged by a plate or wing 132 upon a rod 133. This rod is subjected to a torsion spring 134 which constantly tends to turn in so as to permit the engagement of pawl 128.

Near the front of the rack there is mounted member 135 having notch 136 adapted to be engaged by a coupling member 137 on a rod 138 which extends through the door and terminates on the outside of the door in a handle 139. At the outer end of rod 133 there is a finger 140.

Handle 139 is normally turned, as indicated in Fig. 1, so as to engage cover 45 and hold it in position. When handle 139 is in this position, the coupling member 137 turns part 135 to a position where it holds finger 140 at such an angle as to raise wing member 132 and thereby hold pawl 128 in inoperative position. As will be seen from the left of Fig. 25ª, when the parts are in this position, the cam portion of part 135 is a little past its highest rise against finger 140, and, therefore, the weight of the parts as well as springs 130 and 134 tend to hold the handle and parts in the position to which they have been moved. The movements of handle 139 may be limited by stationary pin 139ª and lug 139ᵇ, and the movements of part 135 may be similarly limited.

Figures 21, 22, 23, 25:
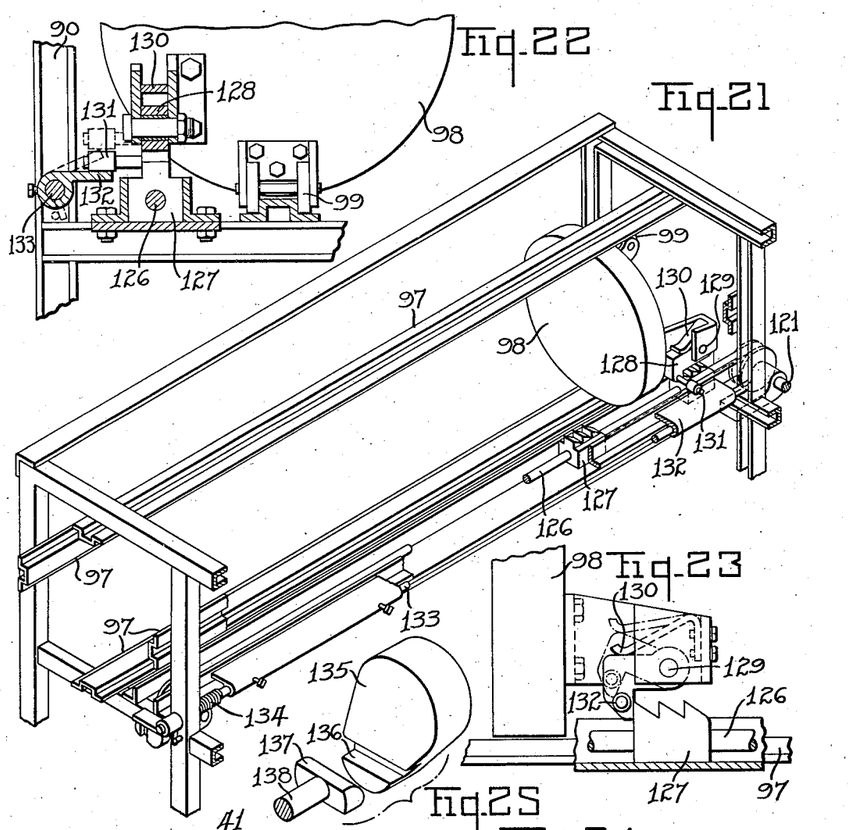
Fig. 21 is a view of one compartment of the carrier rack.
Fig. 22 is a detail view of the means for operating the follower for discharging material from a compartment.
Fig. 23 is a detail of a pawl employed in the discharging means.
Fig. 25 is a detail of the connection between the handle carried by the door and the means carried by the carrier rack disclosed in Fig. 24.
Figures 24, 25A:
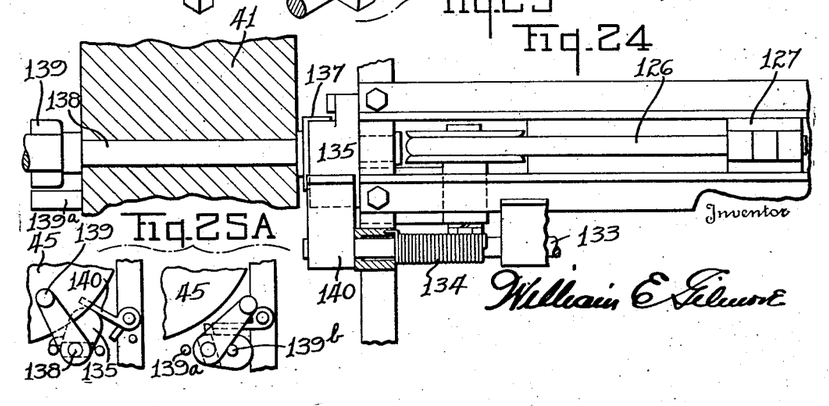
Fig. 24 is a detail illustrating the outside handle for connecting and disconnecting the discharging means and its operated relation to the parts shown in Fig. 21.

It will be seen from the above that, when it is desired to remove a can of ice cream from any particular compartment, the handle 139 at the chosen discharge door 45 is turned to the position in which it is shown at the right of Fig. 25ª, so as to release the door and at the same time lower cam member 135 from finger 140 so that the wing member 132 is released and pawl 128 is allowed to engage toothed member 127 in the particular compartment back of the chosen discharge door 45. Thereupon handle 117 may be operated and upon movement of rod 112 and consequently of member 126, follower 98 is moved towards the discharge side of the truck, shoving the ice cream cans in front of it.

During this operative movement of the cans they engage rubber flange members 53 and so provide no opportunity for warm air to enter the truck body. Handle 117 may be operated once or as many times as desired in accordance with whether one or more cans are to be discharged. A convenient method, where cans of different sizes are to be carried, is to have one movement of member 126 move far enough to discharge the shortest can carried and have the longer cans multiples of that short distance. In this way the handle 117 may be operated once to discharge a short can or two or more times to discharge a can a multiple of the length of the short can.

When the desired can or number of cans has been discharged, the door 45 is returned to position and handle 139 turned to secure the door in its closed position and to prevent re-engagement of pawl 128 with toothed member 127. Either thereafter or simultaneously, if there are more than one attendant, a like discharge operation may take place at any other selected discharge door 45.

It will be noted that the outer can within each compartment normally extends into the discharge opening so as to engage rubber gasket flanges 53, as previously indicated. It will also be understood that when the cans are moved along a can length so that the outer can projects from the discharge opening, the next following can is projected into the opening the same as the outer can was originally, and when the outer can is pulled on out of the discharge opening, the following can prevent escape of cold air or entrance of warm air even before the door 45 is closed.

Also when the last can is discharged, follower 98 follows into the discharge opening enough so as to seal the opening and perform the same office, preventing access of outside air or escape of refrigerated air during the removal of the last can.

Figure 9:
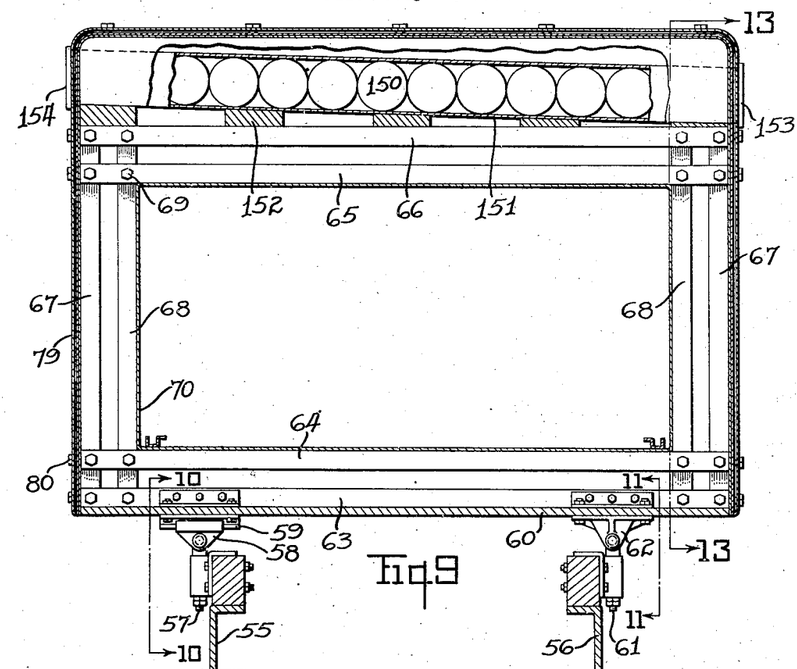
Fig. 9 is a somewhat diagrammatic cross sectional view showing the mounting of the truck body upon the frame.

Customarily the truck delivering full ice cream cans also picks up empties. These are comparatively light, but storage space for them is necessary. This may be provided as indicated at the top of Fig. 9 where empty cans 150 are shown in a runway 151 provided above the refrigerated space. These runways, as shown, may be supported on blocks 152 or the like in such a manner as to be lower on one side than on the other, the cans being filled into the higher side and discharged from the lower side. The lower openings may be closed by a discharge gate 153 and the filling openings may be closed by doors 154. The run ways may be of different widths, as indicated on Fig. 1, to accommodate full size and half size cans respectively, or for other varying lengths as preferred.

Members 126, which reciprocate for discharging cans, may be of any desired construction throughout the main portion of their length, but must be flexible where they pass over the operating pulleys for a distance sufficient to allow of their reciprocation. Preferably the flexible portion is attached at approximately its middle point to the operating pulley and the parts are so proportioned that the movement of the operating pulley through approximately 180° suffices for the reciprocation, so that the point at which the flexible member is attached to the pulley oscillates from a point approximately directly below the axis of the operating pulley to a point directly above that axis during the discharge movement, and then returns to its original position.

It will be readily seen, viewing Fig. 9 for example, that member 55 may rise at one end while it falls at the other end with respect to member 56 with a consequent weaving of the truck body without appreciable distortion of the frame members of the body from their rectangular relation, each frame retaining substantially its rectangular form, but the successive frames curving with respect to each other, since this is allowed by the flexible panel connections therebetween. It will be readily understood that this weaving is a small amount in actual measurement, but it is sufficient to allow appreciable give of the truck body in response to variations in the road over which the truck passes and greatly relieves the strain and jolt consequent upon the usual rigid construction. With the ordinary construction it would be necessary, if frame member 55 rose or fell at one end with respect to frame member 56, for it to twist also about a horizontal axis, but in the construction shown, by reason of the swivel joints and the sliding connections 58 and 59, the frame members do not have to twist in this way. If frame member 55 should rise above frame member 56 at one end and fall below at the other end, it is evident that much torsion would be exerted if it were held always in the same relation to the frame member 56, but by the construction shown this relative movement does not place this strain upon the supporting beams or upon the truck body. This results not only in smoothing out the operation of the truck, but greatly lessens the strain both upon the supporting frame and upon the truck body itself.

The above-mentioned points are very important in connection with the possibility of a light body construction in accordance with this disclosure, and are connected in their purpose to the supporting of the load within the refrigerating chamber directly upon the floor of the chamber rather than upon the side walls or roof of the chamber.

As previously indicated, it is preferable also, when refrigerating means is to be employed, to support that upon the rack which supports the material to be refrigerated. Where this cannot be done, it is preferable to support the refrigerating means in or beneath the floor of the truck with means for creating forced circulation rather than carrying the refrigerating means in or suspended from the roof of the refrigerating chamber, as has been customary.

Figures 30, 31, 32:
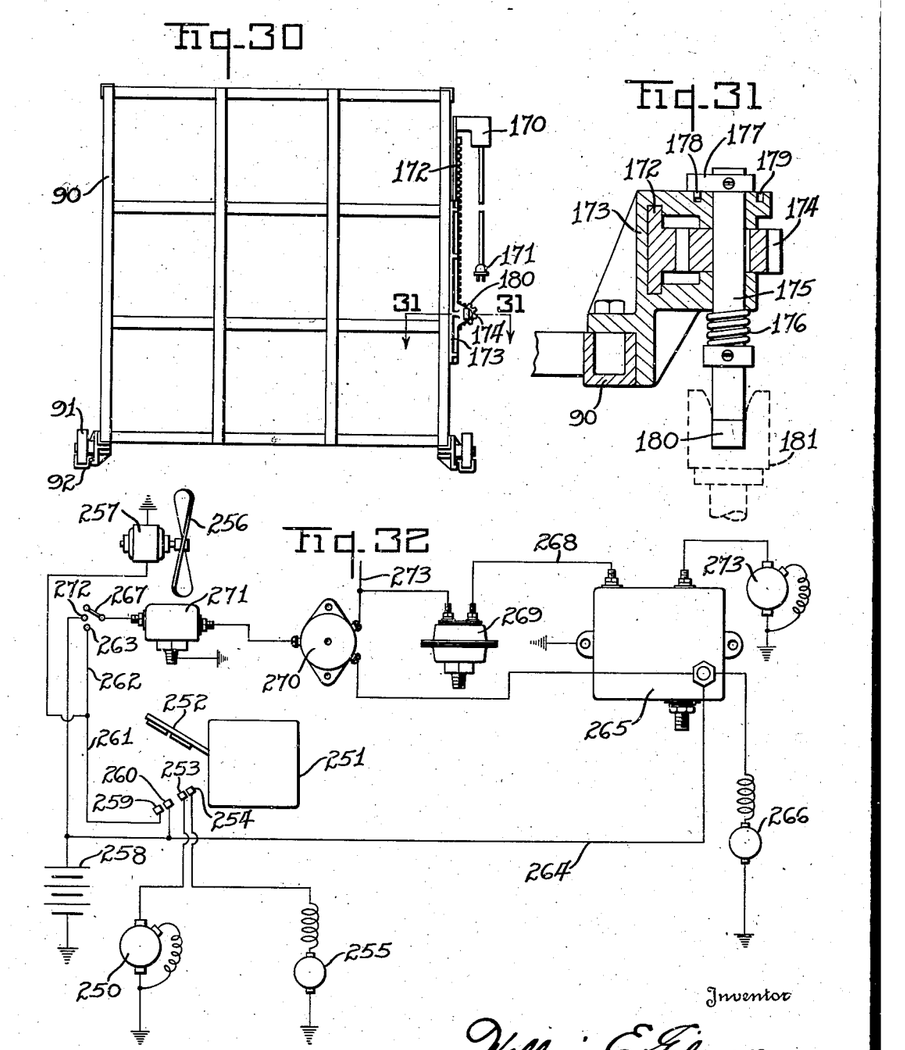
Fig. 30 is a somewhat diagrammatic view illustrating the method of positioning a thermostat for controlling the refrigeration of the truck body.
Fig. 31 is a detail view of a connection to a handle for controlling this thermostatic unit illustrated in Fig. 30.
Fig. 32 is a diagrammatic illustration of apparatus for automatically controlling mechanical refrigeration of the truck operated by the truck motor.

Under some conditions, where ice cream is to be delivered within a reasonable time, the construction shown is sufficiently insulated so that properly chilled ice cream may be loaded into the truck, the large doors closed, and the necessary discharge take place from time to time as described without additional refrigerating means, the ice cream itself acting as a sufficient chilling agent for the refrigerating chamber. This is true to a greater extent than in any other delivery truck arrangement of which I am aware because of the construction whereby the cans may be delivered as desired, without the escape of chilled air or the entrance of warm air during such delivery of the cans. While any selected compartment of a rack may be emptied to any degree desired at any time regardless of the other compartments, it is preferable to empty the upper compartments first, so far as may be done conveniently. This is because the upper part of the refrigerated space is naturally warmer than the lower part and, as the space warms up somewhat during the delivering operation in spite of the careful insulation, the delivery of the cans from successively lower positions may substantially offset this rise in the temperature of the refrigerated space, that is, as the cans gradually warm from the top downward, the cans at each level reach approximately the same temperature when delivery is reached at that level.

Where it is necessary to employ some refrigerating means, a refrigerating bunker of any desired refrigerant, such as indicated at 101 in Fig. 17, may be provided in the can carrying rack or, as previously indicated, under certain circumstances refrigerating means may be mounted permanently on the truck body. In either case it is preferable to control the operation of the refrigerant by a thermostat in order to provide an even temperature within the refrigerated space. In Figs. 30 and 31 there is indicated somewhat diagrammatically an improved arrangement for such thermostatic control. As shown in Fig. 30, a thermostatic element 170 is shown mounted upon the rack 90. The thermostat may be connected by a coupling 171 with the permanent unit on the truck or with a unit mounted in one of the compartments of the rack, whichever may be employed.

The thermostat is shown mounted upon a vertical rack 172 sliding within a guideway 173 and meshing with a pinion 174 on a shaft 175. A spring 176 constantly presses a collar 177 on shaft 175 against the bearing in which it is mounted, and holds a projection 178 within a respective groove or notch 179. Shaft 175 is provided with a head 180 adapted to engage a coupling 181 of a handle, not shown, and suitably mounted upon the door of the compartment within which the rack 90 is enclosed. By turning this coupling 181, pin 178 is forced to the desired notch 179, raising or lowering thermostat 170, as desired, and the pin and notch are held by spring 176 in close enough connection to prevent unintentional movement of the thermostat.

It will be readily understood that when all compartments of the rack are filled, they must all be kept chilled to the desired point. The warmest point is naturally near the top of the compartment. Therefore, when the rack is filled, the thermostat 170 is raised to its upper position, as indicated on Fig. 30, where it controls the chilling device to maintain the desired chilling effect for the upper layer of goods in the upper compartment of the rack.

When the upper compartments are emptied, there is no longer need of keeping this space chilled, except for its effect upon the space therebelow. Accordingly the thermostat may be lowered to the top of the second row of compartments and will control the chilling device to prevent the heating of the compartment above a point where it will be injurious to the goods in the second tier of the rack, but does not exert chilling effect to cool the upper portion of the space above the thermostat, which is empty. Similarly, when the next tier of goods is removed, the thermostat may again be lowered. It is believed that the principle is sufficiently illustrated in Fig. 30 so that it may be readily applied to varying conditions, the principle being that the thermostatic control for the chilled space is maintained at the height necessary to properly protect whatever goods are in the chilled chamber but, where the upper part of the chamber is empty, the thermostat is not affected by this portion of the chamber, but is moved down so that it controls only the temperature of the filled portion of the chamber.

It has been found that in trucks, particularly where constructed as herein disclosed and in such a manner that the air in the truck circulates to comparatively little extent, the upper portion of the refrigerating compartment may be many degrees warmer than the lower portion and the arrangement of the thermostat, as described, very materially reduces the amount of chilling necessary. Also, where such material as ice cream is being delivered and it is desired to deliver it at around a predetermined temperature, it will be readily understood that if the same temperature at the top of the truck was maintained throughout the delivery operation, the compartments at the bottom might be chilled more than necessary or desirable, but by the operation described, where the unloading occurs primarily from the upper portion of the refrigerated space and then always from the upper portion of the loaded space, the temperature can be easily controlled so that the ice cream will all be delivered at substantially the same temperature, whereas the ice cream from the lower part of the refrigerated space might be many degrees colder than necessary, if it was delivered at a time when the upper part of the refrigerating space was maintained at the desired delivery temperature.

It will be understood that the difference between the temperature at the top of the refrigerated space and the lower part of the space, described herein, will vary at different stages of delivery and through a variety of reasons, and the preferred method of unloading the upper spaces first is not by any means compulsory although advantageous for reasons stated.

Among other means for chilling the refrigerated space which may be mounted in a compartment of carrier rack 90, if desired, and controlled by thermostatic means such as shown in Fig. 30 or by other suitable means, is a construction illustrated in Figs. 26 to 29 inclusive. In these figures there is indicated dry ice 182 or the like mounted upon a plate 183 having ribs 184 projecting therefrom. In the form shown, plate 183 is of L-shape and the ribs project downward from the horizontal portion and outward from the vertical portion. The plate is mounted in an insulating box 185 having an insulating cover 186. Doors 187 and 188 control openings into the spaces between ribs 184. From door 188 there extends a flue 189 containing a fan 190 and having across its end fins 191 adapted to direct downward gases discharged from the flue by the fan.

There is also provided a pipe 192 leading from the dry ice compartment immediately above plate 183 to a valve 193, which may be thermostatically controlled. When the temperature is such that further cooling is desired, valve 193 is opened and gases from the dry ice chamber are allowed to pass downwardly into finned pipe 194, where they absorb heat. If, instead of dry ice, wet ice is employed, a similar arrangement may be made, but in that case it is advisable to provide a valve 195 to an outlet pipe 196 for water. The gases from dry ice or the like may be returned to the dry ice space through pipe 197, this pipe opening into the top of the dry ice space. Inasmuch as the top of the dry ice space will normally be warmer than the lower portion and the gas in pipe 197, after absorbing heat in pipe 194, will be warmer than the gas in pipe 192, there is a natural convection current which provides quite effective cooling which may be controlled thermostatically by valve 193. It is also preferable, in the case of dry ice, to provide a relief valve 198 through which excess gas may escape from the dry ice compartment to the open air when the pressure rises to a predetermined extent, this gas being preferably led through a finned pipe 199 so as to absorb such heat as it will from the refrigerated space before it is discharged into the open air.

Figures 26, 27, 28, 29:
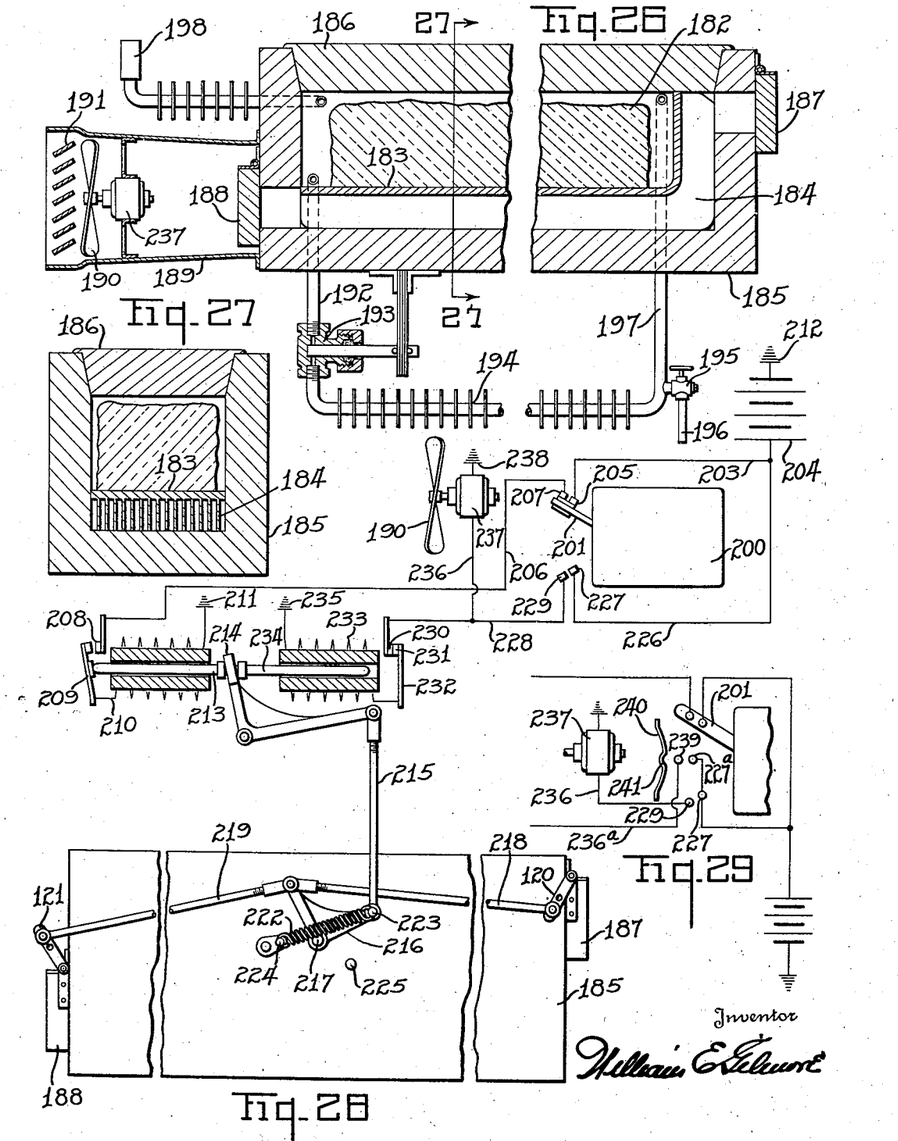
Fig. 26 is a view of an arrangement for utilizing dry ice or the like as a refrigerant.
Fig. 27 is a cross section approximately on the line 27—27 of Fig. 26.
Fig. 28 is a diagrammatic view illustrating a wiring diagram for controlling the doors and fan of the apparatus shown in Fig. 26.
Fig. 29 is a detail wiring arrangement for a method of operation slightly different from that indicated in Fig. 28.

In Fig. 28 there is a diagram indicating the control for the doors 187, 188 and fan 190. In this construction a box 200 containing a thermostatically controlled switch has projected therefrom switch arm 201. A lead line 203 leads from a battery 204 to a terminal 205, while a lead line 206 leads from terminal 207 to terminal 208. A spring mounted terminal 209 is normally in contact with terminal 208 and connects with one end of a solenoid coil 210, the other end of which is grounded at 211. Battery 204 is indicated as being grounded at 212. Of course, a closed circuit may be made otherwise. It will be seen that when the arm 201 is in the upper position in which it is shown, the terminals 205 and 207 are connected, making connection from the battery to the solenoid coil when terminal 209 is in its normal position. Within solenoid 210 there is a core 213 connected to one arm of a bell crank lever 214, the other end of which is connected by a link 215 to a bell crank lever 216 pivoted on box 185 at 217. The other arm of bell crank lever 216 is connected by links 218 and 219, respectively, to arms 220 and 221, respectively, extending from the hinge mountings of doors 187 and 188. It will be seen that, when core 213 is in its right hand position, bell crank lever 216 will be oscillated so as to open doors 187 and 188. A spring 222 is connected to a pin 223 on bell crank lever 216 and also to a pin 224 mounted upon the side of the insulating box 185. The respective pins 223 and 224 are in such relation that, when the doors are open, the spring tends to hold them open and, when the doors are closed, the spring tends to retain them in that position. If the doors are open when contacts 205 and 207 are connected, it will be readily seen that coil 110 is energized, drawing the core to the left sufficiently to close the doors. Spring 222 completes the closing of doors 187, 188 and also drives core 213 on to the left sufficiently to separate contact 209 from contact 208.

It will be seen, therefore, that when arm 201 moves to the position in which it is shown in the drawings, it assures the closing of doors 187, 188, but the electrical energy from the battery is utilized only during the closing of the doors, the circuit being broken between contacts 208 and 209 as the closing of the doors is completed.

A lead line 226 connects the battery 204 with terminal 227 while a lead line 228 connects terminal 229 with a terminal 230. A terminal 231, mounted upon spring 232, is connected to a solenoid coil 233 having a core 234 connected to core 213. Coil 233 is grounded at 235.

When the temperature within the refrigerating chamber rises to a predetermined point, arm 201 is snapped downward, in a well known manner, and makes connection between contacts 227 and 229. Thereupon current flows from battery 204 through coil 233 and draws its core to the right, thereby actuating bell crank levers 214 and 216 so as to open the doors. As soon as the opening of the doors is started sufficiently to lower spring 222 below pivot 217, that spring continues the opening of the doors until lever 216 contacts a stop pin 225. At this time core 234 is moved to the right far enough to encounter spring 232 and separate contact 231 from contact 230, thus breaking the circuit and stopping the flow of electricity. Accordingly the doors remain open until arm 201 is snapped upward again to the position in which it is shown in the drawings, without utilizing further electric current for that purpose.

A branch line 236 from line 228 is connected to a motor 237 grounded at 238. Motor 237 drives fan 190. It will be readily seen that, as long as contacts 227 and 229 are connected, the fan is driven. From the above description it will be apparent that, when the refrigerating chamber is sufficiently cold and arm 201 is in the position in which it is shown in the drawings, doors 187 and 188 will be closed and fan 190 will be idle. However, as soon as the temperature rises sufficiently to move arm 201 to its downward position, the doors are promptly opened and the fan is started. Also, this automatic control is obtained without any unnecessary use of electrical power, that being utilized only for opening and closing the doors and driving the fan, not for maintaining the position of the doors at either closed or open position. In the construction shown in Fig. 29, the arrangement is very much the same except that the door is opened by a line 236ª, not connected to the fan line or terminal 229, but connected to a terminal 239 which may be connected by switch arm 201 with a terminal 227ª, when the arm is in an intermediate position. The arm is snapped in the usual manner to and from its upward position and to and from its lowered position, but is halted at an intermediate position where it connects contacts 239 and 227ª. This intermediate position of the arm may be controlled in several ways, but is somewhat diagrammatically indicated as controlled by a spring member 240 having therein a curved depression 241 in which the end of the switch arm rests while it is in its intermediate position. It will be understood that, with the parts in position in which they are shown in Fig. 28 with the doors 187 and 188 closed, the refrigerating space may gradually warm up. When it reaches a sufficient temperature to start arm 201 from its upward position, it is snapped down until its end contacts spring 240. Then it is slowed up and eventually stopped with its end in 241 and remains in that position until the temperature rises higher or is lowered so that it returns to its upper position. It will be readily seen that when switch 201 connects contacts 227ª and 239, the coil 233 is energized until doors 187 and 188 are open. Then, of course, the line is disconnected by the separation of contacts 231 and 230. Ordinary convection currents will carry the gases out of door 188 and in at the opening uncovered by door 187, and these convection currents may be sufficient to stop the rise in temperature, and even may be more than sufficient. In the latter case, the temperature will be lowered until arm 201 is snapped upward to its original position whereupon the doors are again closed but, if the convection current is not by itself sufficient and the temperature continues to rise within the refrigerating chamber, a predetermined further rise results in the snapping of arm 201 from its position in notch 241 down to its lower position. Of course, the doors remain open after they have once been opened until the arm is returned to its upward position. When the arm is snapped to its lower position, the fan is energized in exactly the same way as indicated in Fig. 28 and continues to run until the arm is again snapped upward. It will be seen, therefore, that the automatic control indicated in Fig. 29 is a three-stage control, where the doors 187, 188 may be tightly closed or they may be opened and cooling accomplished by convection currents or, in extreme cases, the doors remaining open, a forced draft is added as long as it is necessary.

It will be understood, as implied above, that a construction of this sort may be used with cooling agents other than dry ice, and, of course, might be employed in a stationary refrigerator or in a truck body of an entirely different construction from that disclosed in this application. At the same time it is particularly suitable for mounting in a compartment of a removable rack and controlling the temperature of the compartment within which the rack is placed.

In some instances a refrigerating unit driven by electricity may be employed for cooling the truck body. One way in which this may be done is to have a generator driven by the vehicle motor and generate electricity for driving the motor of the refrigerating unit. In Fig. 32 there is a diagrammatic illustration of how a unit of this kind may be incorporated and provide automatic refrigeration even when the vehicle is not being driven.

In Fig. 32 there is diagrammatically indicated a generator 250 which is driven from the motor vehicle in any desired manner. The refrigeration is governed by a thermostatic control 251 which operates a switch arm 252 to connect terminals 253 and 254 when refrigeration is required. As will be seen, the connection of terminals 253 and 254 closes the circuit from the generator 250 through motor 255 by which the refrigerating unit may be operated.

A fan 256 may be driven from a motor 257 which is connected to the usual battery 258 of the motor when switch arm 252 makes connection between terminals 259 and 260.

The lead line 261 from terminal 259 to motor 257 has a branch 262 leading to a terminal 263.

The diagrammatic illustration indicates a common construction of automatic starting devices for starting the motor of the car. Battery 258 is connected by line 264 to a starting arrangement 265 which is well known in itself, and which energizes the starting motor 266 to crank the internal combustion motor of the vehicle until that motor attains a certain speed, whereupon the energizing of motor 266 is automatically cut out. The starting box 265 operates only when switch 267 closes a circuit from battery 258 through lead line 268 to the starting box. This lead line runs through a vacuum control 269. Also connections are made through a device 270 which cuts out the starter in case of back firing and through a device 271 which limits the time during which the starting motor will operate, if the internal combustion motor does not start within that time.

It will be understood that, in the ordinary operation of the motor, switch 267 is moved to close the circuit with contact 272, and so connect directly to battery 258, when it is desired to start the motor. At night or at other times, when the vehicle is not to be moved for a considerable period of time, it may be desirable to run the motor vehicle in order to drive the refrigerating unit. Under such circumstances switch 267 may be moved down to close the connection to terminal 263. Under such conditions it will be seen that when terminals 259 and 260 are connected by switch arm 252 the battery is connected to the starting box in the same way that it is normally when switch 267 is connected to terminal 272. In other words the motor will be automatically started, if switch 267 is left in contact with terminal 263, whenever the temperature indicated by a thermostat 251 requires the operation of the refrigerating unit. It will be understood that a branch 273 from line 268 is run to the ignition coil, in the usual manner, so that when the connection between terminals 259 and 260 is broken the vehicle motor is stopped.

By the arrangement indicated the refrigerating unit may be driven by a motor 255 receiving current from generator 250 at any desired voltage, such as 110 volts, while the fan 256 is driven by connection with the regular vehicle electric system connected to the battery and fed by the usual vehicle generator 274.

Figures 15, 33:
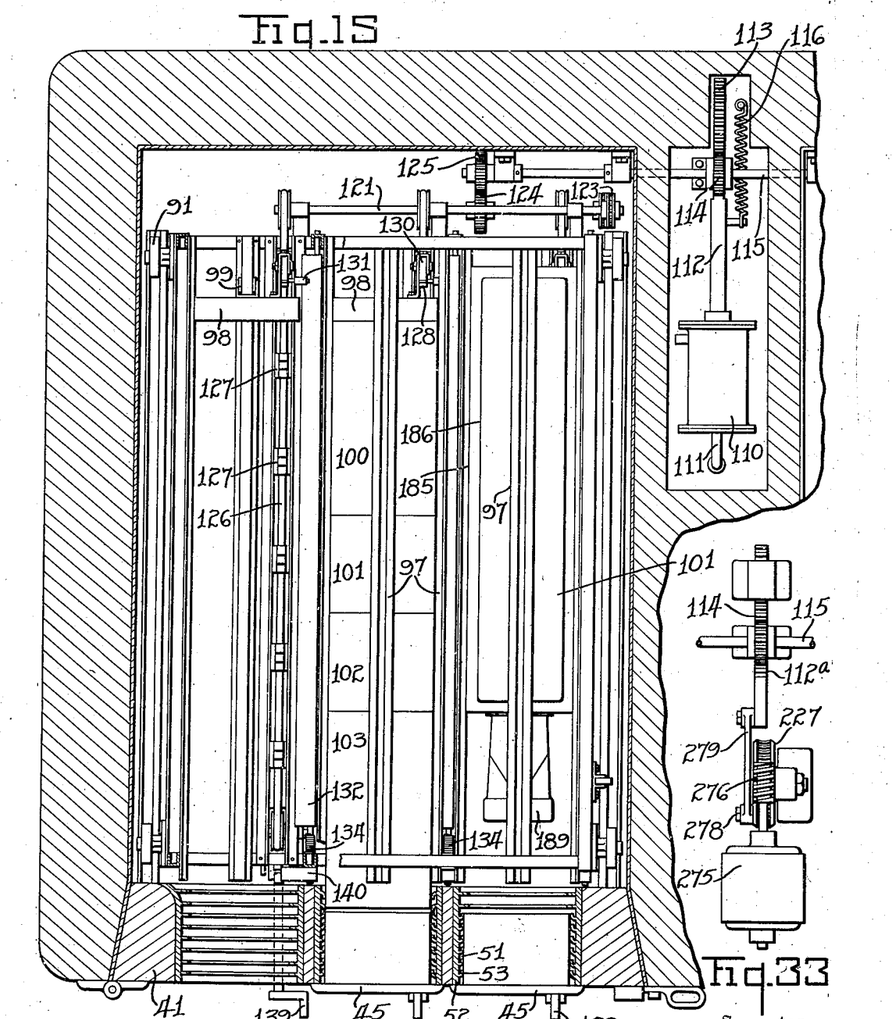
Fig. 15 is a horizontal section of a portion of the truck showing a carrying rack in place therein.
Fig. 33 is a somewhat diagrammatic view of an electric drive for the discharge device.
Figure 16:
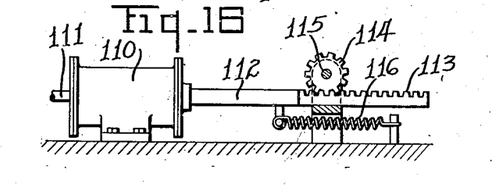
Fig. 16 is a detail of a vacuum operated means for discharging material from the truck.

In Fig. 33 there is shown an alternative construction by which the discharging apparatus may be operated by electricity instead of vacuum. In the construction shown, a motor 275 drives a worm 276 and worm wheel 277 which in turn operates a crank 278 connected by a link 279 to a member 112ᵃ corresponding to member 112. It will be readily understood that motor 275 is started at will by a switch corresponding to handle 117, and that automatic means, now shown, stops the motor, after the crank has made one complete revolution, until the starting switch is again operated.

The operation of the device has been described in connection with the description of the several parts, and therefore the complete description of the operation will not be repeated, but for convenience some of the important features of operation will be pointed out.

The truck body is constructed so that it affords very good heat insulation while allowing weaving of the body in response to inequalities in the wad over which the truck passes. Most of the parts are duplicated many times in the same body, facilitating economical manufacture, and the whole may be shipped knocked down and easily assembled where it is to be used.

Figure 10:
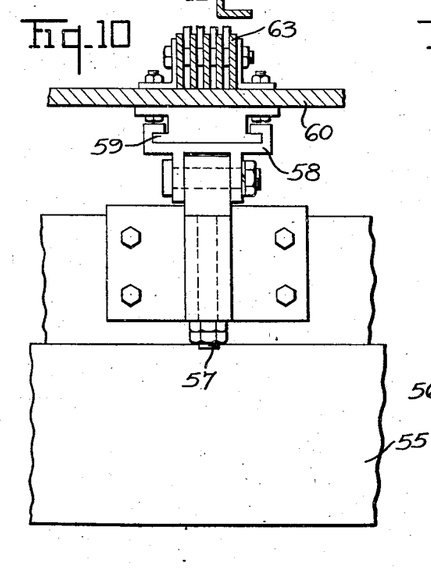
Figs. 10 and 11 are detail views approximately on the lines 10—10 and 11—11, respectively, on Fig. 9.
Figure 11:
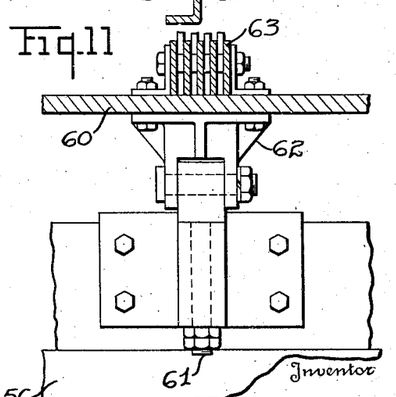

The mounting of the body illustrated in Figs. 9, 10 and 11 co-operates with the structure of the body to allow limited weaving without causing undue stresses, further facilitating light construction.

Carrying the load on racks which are run into the truck body and rest upon and are locked to tracks upon the floor, likewise facilitates light construction, as it places the load upon the floor and not upon the sides or top of the body. Also this method of loading the truck facilitates chilling the rack and material thereon in a refrigerator room at the warehouse, where the refrigeration may be done most cheaply and conveniently, and reduces and sometimes eliminates the refrigeration ordinarily required by refrigerating means in the truck body itself.

By mounting a refrigerating bunker in the rack carrying the material to be refrigerated, the loading of the bunker is facilitated and does not delay the loading of the truck, which the use of racks reduces to a very easy and speedy operation. Also, it places the bunker in the upper part of the refrigerated space in the truck body without imposing any weight upon the sides or top of the body.

The use of large doors through which racks are run carrying the load into the body enables the truck to be loaded in a minimum of time, while the small discharge doors through the large door provides for the delivery in small amounts without opening the large loading doors and losing the cold air within the body.

The system of discharge through gaskets prevents the loss of refrigeration which might otherwise occur through the opening of even the small discharge doors. The power means for discharging the material is very helpful, if not necessary, with such materials as ice cream, in providing the desired discharge through gaskets without the loss of refrigeration. The provision by which the same power means may be utilized to discharge material through any one of a plurality of discharge doors as controlled selectively from outside the truck body also cooperates with the other features to make possible the delivery of material as and when desired without requiring opening to and rummaging in the truck body to find and discharge the desired material.

The method of thermostatically controlling the temperature at the highest point where the cooling is necessary, but not any material distance above that point, cooperates with the other features to minimize the refrigeration necessary and reduce the consequent load and lighten the truck.

The method of controlling the refrigeration of a bunker shown in Figs. 26 to 29 inclusive, by efficient use of the refrigerant, aids in reducing the necessary weight of the bunker, makes more feasible its mounting in a material-carrying rack, and contributes its parts to the delivery of material while hauling a minimum of weight in addition to the material to be delivered.

The construction shown in Fig. 32 makes possible the maintenance of a desired refrigeration within the body while the truck is standing still, and if desired even when no attendant is present, merely by use of the refrigerating unit frequently provided with refrigerator trucks. By keeping the truck cold, the load placed upon the refrigerating unit, and the consequent capacity and weight of unit necessary, is reduced, since the unit is not required to cool the body in a short time from a warm condition, but needs only a capacity that will maintain the cool condition of the body.

While the various features cooperate in forming an efficient delivery refrigerator truck and system of operation, it will be readily seen that many of the described features might be used separately or in other relations to considerable advantage, although sacrificing the advantages of the combinations, and that less than all of the features may be united to obtain the advantage of their combination without including all of the described features. Also, many changes may be made in the construction and arrangement of the disclosed parts within the scope of the appended claims.

What I claim is:

1. A truck body having tracks on its bottom, a material-carrying rack adapted to run onto said tracks, a door of a size and in a position to admit the rack onto the tracks, and a plurality of small doors in registry with different portions of said rack while it is on said tracks.

2. A refrigerator truck body having a discharge opening surrounded by a gasket, power means for discharging material through said opening and in contact with said gasket, and means operable from outside the truck body for controlling said discharging means.

3. A truck body having a refrigerator compartment therein adapted to receive a can, and an opening from the compartment approximately fitting the cross-section of the can, and power means to discharge said can from the compartment through said opening.

4. A truck body having a refrigerator compartment therein, vacuum operated means for discharging material from said compartment, and a valve outside of said compartment and controlling the vacuum to said means.

5. A refrigerator compartment having therein means to support goods removable in zones one above another, apparatus for cooling said compartment, a thermostat for controlling the cooling apparatus, and means for selectively holding the thermostat in position in said zones, whereby the operation of the cooling means is controlled in accordance with the temperature of the selected zone.

6. Refrigerating means comprising an insulating box, cooling means within the box, inlet and outlet doors for the box, a fan in position to create a draft through said doors, and thermostatically controlled means for starting said fan and opening said doors at least as soon as the fan starts and closing said doors and stopping said fan at least as soon as the doors close.

7. The method of refrigerating material and delivering portions of it at a predetermined temperature, which consists in placing different portions of the material in a refrigerating chamber at different levels, delivering the different portions at different times from different levels, thermostatically controlling the temperature of said chamber, and changing the level of the thermostat, exercising this control from time to time to place it at approximately the level of the portion to be next discharged.

8. The method of delivering refrigerated material at approximately predetermined temperature which comprises loading the material into a refrigerating compartment of a vehicle at a temperature below the desired delivery temperature and at different levels, and delivering the material first from the upper level and then from successively lower levels at approximately the rate at which the successive levels warm up to said predetermined temperature.

9. A truck body having a refrigerator compartment therein, a plurality of doors in the side of the compartment at different levels, means to support material within the compartment on said different levels, means to discharge refrigerated material from the compartment from one of the doors at a time and from the level at which said door is located, a thermostat controlling the refrigeration of the compartment, and means for selectively holding the thermostat at said levels.

10. A truck body having a refrigerator compartment therein a plurality of doors in the side of the compartment at different levels, means to hold a row of articles inside of the compartment and in line with each door, means to deliver articles from a row through the door with which they are in line, a gasket around the door opening and constructed to substantially fit around the articles as they are delivered, a thermostat controlling the refrigeration of the compartment, and means to change the elevation of the thermostat and bring it to the level of any one of said doors.

11. A truck body having a refrigerator compartment therein, a plurality of doors in the side of the compartment at different levels, means to hold a row of articles inside of the compartment and in line with each door, means to deliver articles from a row through the door with which they are in line, and a gasket around the door opening and constructed to substantially fit around the articles as they are delivered.

12. A truck body having a refrigerator compartment therein, said compartment being provided with a large loading door and a plurality of smaller discharge doors, a rack movable into and out of said compartment through the loading door and having supports for articles in line with the discharge doors, and a refrigerating bunker supported on the rack.

13. A truck body having a refrigerator compartment therein, said compartment being provided with a large loading door and a plurality of smaller discharge doors, and means insertable into the compartment through said large door for supporting a row of articles in line with each discharge door.

14. A refrigerating compartment for a truck, said compartment being provided with a large door, a plurality of relatively small discharge doors, means insertable into the compartment through the large door for supporting a row of articles in line with each discharge door, a gasket about each discharge door constructed to fit around an article in the row in alinement therewith, and means to move one selected row as a unit towards the discharge door to discharge at least one article therethrough and to leave the undischarged row in line adjacent the door.

15. A refrigerator compartment for a truck, said compartment having a plurality of discharge doors, a support for a row of articles in line with each of said discharge doors, a gasket at each discharge door constructed to fit around an article in the row in alinement therewith, and means to move a selected row of the articles as a unit to discharge at least one article through the gasket and open discharge door, and to position in the gasket the article next to the last one discharged by said movement.

16. A truck body having a refrigerator compartment therein, said compartment being provided with a large loading door and a plurality of smaller discharge doors, a rack movable into and out of said compartment through the loading door and having supports for articles in line with the discharge doors, a refrigerating bunker supported on the rack, a gasket at each discharge door constructed to fit around an article in the row in alinement therewith, and means to move the row as a unit towards the discharge door to discharge at least one article therethrough, and to leave the undischarged portion of the row in lieu adjacent the door.

17. A truck body having a refrigerator compartment therein, a plurality of discharge doors in the side of the compartment, means to hold rows of articles within the compartment in line with the several doors, and means to move an entire row to discharge a selected number of the articles through the discharge door in line with such row and to leave a solid line of articles extending inward from the door after the articles have been discharged and the door closed.

18. A refrigerator compartment and a refrigerating device within the compartment, said device comprising an insulating box having inlet and outlet doors, cooling means within the box and means for opening and closing the doors, the last said means comprising electric means for starting the opening and closing of the doors, thermostatic control means energizing the door-opening electric means upon the temperature in the compartment rising to a predetermined point for energizing the door-closing electric means upon the temperature in the compartment dropping to a predetermined lower point, and spring actuated means completing the opening and closing of the doors when the respective movement is initiated by the door moving electric means and for de-energizing the respective electric means upon completion of the door movement initiated by said respective means whereby the electric means is energized for both door-opening and door-closing movements only during the time necessary to initiate said movements.

19. Apparatus in accordance with claim 6 in which the thermostatically controlled means comprises means for starting the fan simultaneously with the opening of the doors and for stopping the fan simultaneously with the closing of the doors.

20. Apparatus in accordance with claim 6 in which the thermostatically controlled means comprising means for opening the doors at a first predetermined temperature and for starting the fan at a second and higher predetermined temperature and for stopping the fan when the temperature lowers to a predetermined point and for closing the doors when the temperature lowers to a predetermined point lower than that at which the fan is stopped.

21. A refrigerator compartment, an insulating box, cooling means within the box, passages between the interior of the box and the compartment, said passages opening into the box at different levels, whereby a convection current is created from the compartment, through the box and into the compartment when said passages are open, doors for closing said passages, thermostatic means controlled by the temperature in the compartment for opening and closing the doors, a fan in position to accelerate the convection current when the doors are open, and means operating the fan only when the doors are open.

22. A refrigerator compartment, an insulating box, cooling means within the box, passages between the interior of the box and the compartment, said passages opening into the box at different levels, whereby a convection current is created from the compartment, through the box and into the compartment when said passages are open, doors for closing said passages, thermostatic means controlled by the temperature in the compartment for opening and closing the doors, a fan in position to accelerate the convection current, when the doors are open, and means starting the fan when the temperature in the compartment is higher than the temperature at which the doors are opened and stopping the fan when the temperature drops to a predetermined point above that at which the doors are closed.

WILLIAM E. GILMORE.